June 19, 1934. C. H. CURRIE 1,963,354
SEWAGE STABILIZATION APPARATUS AND PROCESS FOR OUTFALL SEWERS
Filed Feb. 8, 1932
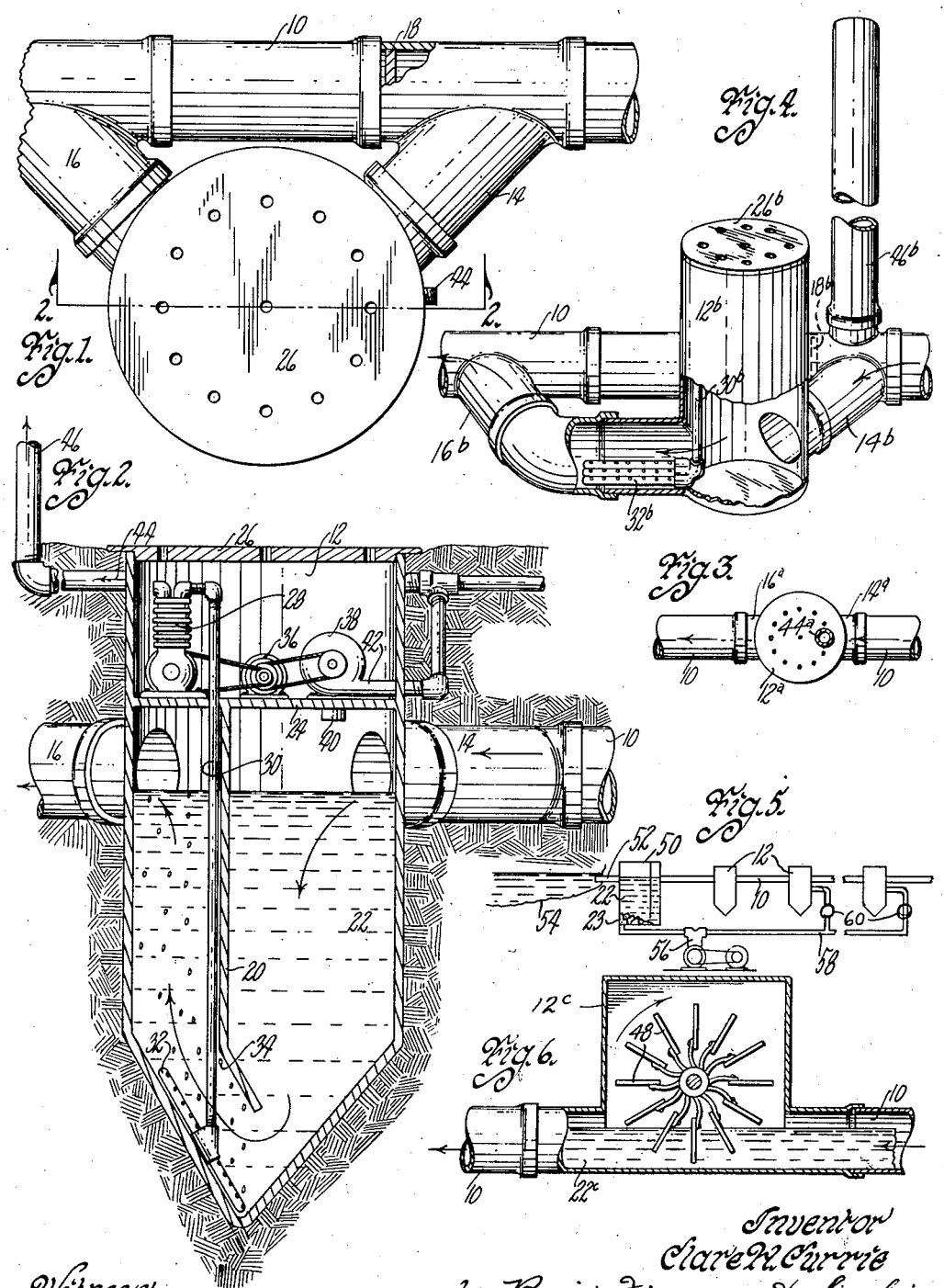

Patented June 19, 1934

1,963,354

UNITED STATES PATENT OFFICE 1,963,354

SEWAGE STABILIZATION APPARATUS AND PROCESS FOR OUTFALL SEWERS

Clare H. Currie, Webster City, Iowa

Application February 3, 1932, Serial No. 591,643

6 Claims. (Cl. 210—26)

An object of my invention is to provide an apparatus for stabilizing or re-oxygenating sewage in outfall or main collecting sewers, which is comparatively durable and inexpensive to manufacture and to provide a process, which is comparatively simple, for stabilizing or re-oxygenating outfall sewage.

The term "stabilizing" refers to treating the sewage so as not to upset its original condition. In its original condition it is not septic and if this condition can be maintained, the sewage does not become septic. By supplying plenty of oxygen for the sewage to absorb the sewage can be stabilized so that it does not become septic.

A further object is to provide a process for stabilizing sewage in outfall sewers which comprises the aeration or reoxygenation thereof by the introduction of oxygen (such as compressed air which contains oxygen) to the sewage below the surface thereof at points which are timed distances apart, for thereby maintaining sufficient oxygen in the sewage to prevent septic action and stabilize it so that there will be little or no likelihood of producing destructive, noxious or poisonous gases.

A further object is to provide a step in the process consisting of the removal of any gases which are produced from the sewage. Re-oxygenation and removal of gases provide ventilation for the sewage which releases the gases from the sewer and establishes an atmosphere therein which is comparatively fresh from which additional oxygen will be absorbed by the sewage flowing through the sewer.

Still a further object is to provide an apparatus for stabilizing sewage in an outfall sewer which comprises an air compressor or blower for discharging air below the surface of the sewage at given spaced points and to also provide means for extracting the sewer gases from the sewer according to the practice of my process.

With these and other objects in view my invention consists in the construction, arrangement and combination of the various parts of my apparatus and in steps of the process, whereby the objects contemplated are attained, as hereinafter more fully set forth, pointed out in my claims and referred to in the accompanying drawing, in which:

Figure 1 is a plan view of my stabilizing apparatus connected with an existing sewer of the outfall type.

Figure 2 is a vertical detail sectional view on the line 2—2 of Figure 1.

Figure 3 is a plan view of an arrangement of the apparatus shown in Figure 1 where the apparatus is installed in a new sewer.

Figure 4 is a perspective view of a modified apparatus;

Figure 5 is a diagrammatic view of an apparatus including an "activated sludge" feature; and Figure 6 is a vertical sectional view of still another modified form of the apparatus.

First, I will describe my apparatus and then describe its function and advantages as well as the process involved in its use. In Figure 1, I have shown an existing sewer with a stabilizing chamber 12 connected therewith by inlet and outlet connections 14 and 16 respectively.

The fittings 14 and 16 can be placed against the sewer 10 and cemented or otherwise sealed relative thereto after which the portions of the sewer 10 covering the ends of the fittings 14 and 16 which are against the sewer 10, can be broken through. Thus the stabilizing chamber 12 can be installed in an existing sewer, without interfering with the flow of sewage therethrough. After the stabilizing chamber is installed, a plug 18 is inserted in the sewer 10 between the fittings 14 and 16 to by-pass sewage through the stabilizing chamber instead of allowing it to pass straight through the sewer itself.

In Figure 3, however, I have shown a stabilizing chamber 12a with inlet and outlet connections 14a and 16a which can be connected directly in the sewer 10. Thus in newly constructed sewers by-passes as shown in Figure 1 are not necessary and this considerably reduces the cost of the stabilizing unit which can be directly inserted in the sewer as an enlarged port thereof.

The stabilizing chamber or conduit 12 (see Figure 2) preferably has substantial depth and is provided with a partition 20 extending both above and below the level of the sewage 22 in the chamber and the sewer 10 and fittings 14 and 16. A base plate 24 seals the upper part of the chamber 12 against communication between atmosphere and the fittings 14 and 16. The chamber 12 is preferably covered with a manhole cover 26 or the like.

Within the chamber 12 above the base plate 24, I provide an air compressor 28. The exhaust pipe 30 of the air compressor 28 extends below the surface of the sewage 22 and communicates with a perforated grid member 32.

The grid is provided so as to distribute perforations through the body of the chamber 12 so that when compressed air is forced through the pipe 30, it will escape from the grid in the form of bubbles 34 and rise through the sewage 22 on the outfall side of the partition 20.

The air grid 32 is preferably arranged so as to prevent settling of the sewage solids and also increase the upward velocity sufficiently to carry the solids up and into the fitting 16.

Any desired means may be provided for operating the air compressor 28. In Figure 2, I have shown an electric motor 36 for this purpose. A blower 38 is also operated by the motor and draws sewer gas through its intake 40 from the chamber 12. This gas is then discharged through the pump outlet 42 to a sewer gas line 44. The line 44 is connected with a stack 46, or may extend to any point where the discharge of sewer gas is not objectionable.

In Figure 4, I have shown a modified form in which a stabilizing chamber 12b is provided. An air compressor or small blower is mounted in this chamber the same as in the chamber 12 and discharges air from a grid 32b. The compressed air does not have to be forced so far below the surface of the sewage in the construction shown in Figure 4 and therefore a small blower can be used instead of the compressor shown in Figure 2. The pressure required is so slight that a blower can thus be used and is much more economical than a compressor. Instead of using a blower to remove the sewer gas, I have shown a stack 46b so that the natural draft created therein will withdraw the sewer gas from the sewer 10.

In Figure 5, I have shown an arrangement whereby activated sludge can be returned into the sewer 10 for the purpose of more effectively purifying or oxidizing the sewage, especially where the sewer is not very long.

For instance, it ordinarily takes about twenty hours with aeration to obtain the maximum of stability in the sewage. If the length and grade or slant of the sewer is such that there is not enough time to stabilize it, the activated sludge feature of Figure 5 can be incorporated in the system. Even where the activated sludge feature is not used, a settling tank 50 must be provided to settle the solids 23 from the sewage 22 before the liquid portion of the sewage is discharged through a discharge pipe 52 into a stream 54. The settled sludge 23 must be disposed of some other way than by discharging it into the stream 54—either by an incinerator or a digesting process. A portion of the sludge 23 may be pumped by the pump 56 back through a pipe 58 to the sewer 10 and this hastens the stabilizing process in the sewer because of mixing of the activated sludge with the sewage coming through the sewer 10.

The sludge itself requires additional oxygen which can be supplied by providing reactivating stations 60 and pumping the sewage through the pipe 58 to the stabilizing stations 12.

In Figure 6 I have shown how the flow of the sewage 22c may be utilized for actuating a paddle wheel 48 for the purpose of re-oxygenating the sewage without utilizing any power for this purpose other than that produced by the flowing sewage. The blades when they travel through the sewage, churn air into it and thus aerate it.

In an outfall or main collecting sewer—that is, the ordinary type which collects raw sewage consisting of domestic or industrial wastes or a combination of the two, and discharges it directly into a river or other stream, with the quantities of water usually mixed with such sewage acting as a vehicle for the sewage, it is found that there is a potential nuisance because of the organic contents of the wastes. Without artificial assistance, these wastes in time will produce septic conditions in the streams into which the sewage is discharged. Septic conditions cause formation of sulphates or sulphides in the sewage and destroy the sewer itself, especially when it is made of concrete. The sulphuric acid changes the calcium carbonate of the cement to calcium sulphate, which is an inert and non-binding material and such action causes crumbling of the concrete and destruction of the sewer.

In an outfall sewer, organic matter or solids in the sewage demands oxygen in order to stabilize the organic matter. If such oxygen is not supplied, the stream in which the sewage is discharged, if large enough, may have enough oxygen in the water thereof to furnish the necessary oxygen for the natural breaking down process of the organic matter in the sewage without nuisance, either from an odor standpoint or from the depletion of the oxygen in the stream to such an extent that the flora and fauna of the stream are not destroyed. Also, where the outfall sewers are large, the concentration of organic matter is such that the oxygen demand is not satisfied and the sewage becomes septic, producing odors of decomposition and all the attendant undesirable conditions.

It has, therefore, been my purpose to provide an apparatus and a process for stabilizing the sewage as it flows through the sewer so as to prevent development of septic conditions and to prevent sewer gas formation before the gases can work destruction on the sewer itself.

In the working out of a process and an apparatus for using the process, it was found that, from the standpoint of economy re-oxygenation is most desirable at predetermined time periods. It is therefore obvious that by providing the re-oxygenation stations certain distances apart as determined by the speed of the sewage through the sewer, the re-oxygenation operations could be performed on the same portion of the sewage at given time intervals.

By experiment, I have found that re-oxygenation at fifteen to thirty minute periods is necessary, depending on the nature of the sewage, its temperature, whether the water carrying it is hard or soft and so forth. Extreme conditions are encountered, of course, where the time period is less than fifteen minutes and others are encountered where it is more than thirty minutes. Where the grade of the sewer is greater, the stabilizing stations can be placed farther apart and vice versa. The most economical plan is to aerate or re-oxygenate the sewage just before it becomes septic. Artificial inhibiting agents, such as chlorine, have been used, but they contribute little or nothing to the purification of the sewage itself, that is they do not oxidize or purify it, but merely delay its septic action.

Referring to Figure 2, the air bubbles 34 rising through the sewage 22 will permit the solids of the sewage to absorb the oxygen from the bubbles and thus re-oxygenate the sewage. Air is preferably used because it does not have to be manufactured and carries a considerable amount of oxygen. Pure oxygen gas of course can be used if found desirable.

Some of the air bubbles rising from the grid 32 will not be absorbed, but will be discharged into the space above the level of the sewage. This serves to freshen the air in the sewer 10, especially when the sewer gases are removed at the next downstream or upstream stabilizing station. From this freshened air the sewage can absorb much more oxygen than it can from foul air, which is filled with sewer gases.

The partition 20 separates the newly reoxygenated sewage from the sewage which has traveled from the last stabilizing station. By pumping the sewer gas from the chamber 12 on the inflow side of the partition 20, the chamber itself and the entire sewer gas and foul air condition between the chamber and the last station can be effectively relieved. Instead of using a power operated blower for ventilation, natural draft can be utilized, as illustrated in Figure 4. Instead of consuming power to operate the air compressor, the flow of the sewage itself can be taken advantage of as in Figure 5 to aerate the sewage.

By using a stabilizing apparatus as I have devised, the sewage, before it enters the stream into which it is discharged, has partially or wholly, been stabilized so that the resulting effluent is practically or entirely purified and relieved of its oxygen demand.

In short outfall sewers where the entire process of stabilization cannot or does not take place (and which condition can be quite closely predetermined) a part of the finally settled solids can be re-activated and returned a sufficient distance up the sewer stream to insure complete treatment if so desired. When the sewage finally enters the stream 54 it is in condition for absorbing little or no oxygen from the stream and objectionable odor is eliminated.

The use of stabilizing stations (supplemented by the return of some of the activated sludge to a previous station where found necessary) along an outfall sewer eliminates the necessity for providing a filter bed or other oxygenating apparatus (except of course a settling tank and sludge disposal means) before the sewage is finally discharged into a stream. This system also prevents the production of explosive gases in the sewer, which gases are dangerous to health and accordingly make sewers inaccessible for repairs, cleaning and the like.

The sewage is kept in a fresh condition, thereby eliminating decomposition and preventing the contamination of streams into which the sewage is discharged. The outfall sewer itself, when my process and apparatus are used, forms a complete and effective sewage disposal system, except for a settling tank and sludge disposal means.

Some changes may be made in the construction, arrangement and combination of the various parts of my apparatus and the steps of the process may be somewhat varied without departing from the real spirit and purpose of my invention and it is my intention to cover by my claims, any modified forms of structure, use of mechanical equivalents or equivalent steps of the process which may be reasonably included within their scope.

I claim as my invention:—

1. A process for stabilizing sewage as it flows throughout the length of a covered outfall sewer comprising the introduction of oxygen to the sewage below the level of the surface thereof at spaced points along the sewer which are such timed distances apart throughout the length of the sewer that said oxygen is introduced and aeration or re-oxygenation thus effected just prior to the sewage becoming septic and the removal of sewer gases and excess gases which tend to cause pressure within the sewer because of the introduction of oxygen thereinto.

2. An apparatus for stabilizing sewage in an outfall sewer comprising a chamber through which all the sewage in said sewer flows, an air compressor for discharging air into said chamber below the level of the surface of the sewage; a blower for removing sewer gases from said sewer at such points and power means operating said air compressor and said blower.

3. An apparatus for stabilizing flowing sewage in an outfall sewer comprising a covered conduit chamber through which all the sewage in said sewer flows, an air compressor for discharging air into said chamber below the level of the surface of the sewage, means in said chamber to prevent the air rising through the sewage from backing upstream through the sewer, means for operating said air compressor and a draft flue connected with said sewer to remove sewer gases therefrom.

4. An apparatus for stabilizing sewage in an outfall sewer comprising a covered re-oxygenation conduit, said sewer leading thereinto and therefrom, a partition in said chamber from the top thereof and extending below the level of the sewage therein and means for discharging compressed air into said sewage on the outfall side only of said partition and below the surface of said sewage.

5. An apparatus for stabilizing sewage in an outfall sewer comprising a re-oxygenating chamber, said sewer leading thereinto and therefrom, a partition in said chamber above the level of the sewage therein and extending below such level, means for discharging compressed air below the surface of said sewage on the outfall side of said partition and means for extracting sewer gases from said chamber on the inflow side of said partition.

6. An apparatus for stabilizing sewage during its flow through an outfall sewer comprising means for releasing air below the level of the surface of the sewage at time spaced points, means for removing sewer gases at spaced points and means for returning a portion of the activated sludge from the discharge end of the sewer to a point substantially spaced upstream from said discharge end.

CLARE H. CURRIE.